United States Patent

Mazon

[11] Patent Number: 5,507,051
[45] Date of Patent: Apr. 16, 1996

[54] PROSPECTOR TOOL

[76] Inventor: Alexander Mazon, 1120 Clark St., Madera, Calif. 93638

[21] Appl. No.: 350,482

[22] Filed: Dec. 7, 1994

[51] Int. Cl.⁶ .............................. A01B 1/00; B25F 1/00; E21C 37/22
[52] U.S. Cl. ........................... 7/116; 7/104; 7/145
[58] Field of Search .................. 7/104, 114, 116, 7/145, 158–159, 170; 294/51, 49, 53.5, 57; D8/10; 224/904, 234, 253

[56] References Cited

U.S. PATENT DOCUMENTS

| 576,756 | 2/1897 | Cole | 7/116 |
| 4,114,216 | 9/1978 | Gatby | 7/116 |
| 4,700,420 | 10/1987 | Belanger | 7/114 |
| 4,905,335 | 3/1990 | Terrola | 7/151 X |
| 5,105,493 | 4/1992 | Lugtenaar | 7/116 |

FOREIGN PATENT DOCUMENTS

| 113361 | 2/1945 | Sweden | 7/116 |

*Primary Examiner*—D. S. Meislin

[57] ABSTRACT

A new and improved prospector tool having a shovel handle. A shovel has a pivotable extending arm thereattached. The pivotable extending arm couples with the shovel handle. The pivotable extending arm serves to position the shovel at different angles. A tool handle is removably secured to the shovel handle. A tool head has an extension thereattached. The extension is integral with the tool handle.

3 Claims, 6 Drawing Sheets

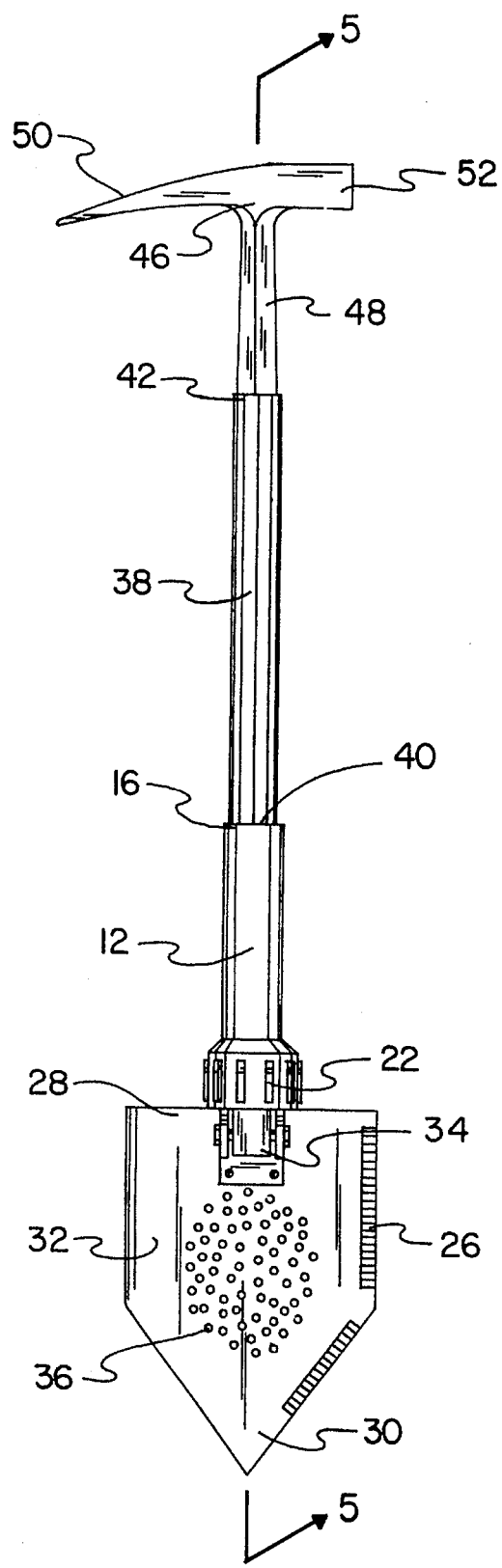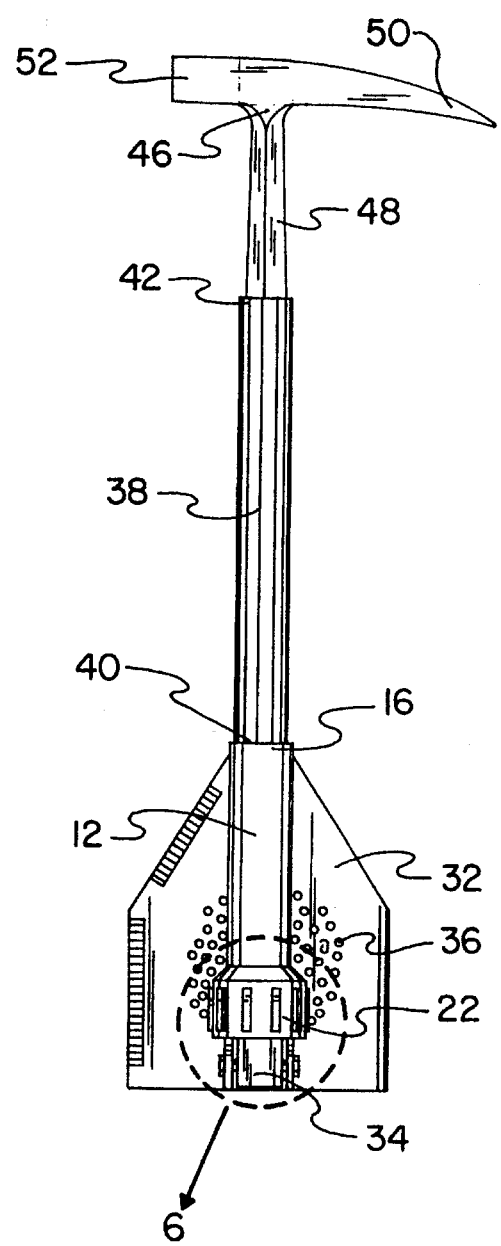
FIG. 2
FIG. 3

PROSPECTOR TOOL

BACKGROUND OF THE INVENTION

1. Field of the Invention

The present invention relates to a prospector tool and more particularly pertains to providing a tool that combines a variety of prospecting tools in one with a prospector tool.

2. Description of the Prior Art

The use of tools is known in the prior art. More specifically, tools heretofore devised and utilized for the purpose of achieving a variety of prospecting tasks are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,092,310 to Walen et al. discloses a mining pick.

U.S. Pat. No. 3,638,986 to Palagonia discloses a combination pick and shovel.

U.S. Pat. No. 4,476,597 to Gobbi discloses a mountaineering implement.

U.S. Pat. No. 5,103,520 to Mazzo discloses a multi-purpose hand tool.

U.S. Pat. No. 4,993,768 to Ewn discloses a combined shovel and utility device.

While these devices fulfill their respective, particular objective and requirements, the aforementioned patents do not describe a prospector tool for providing a tool that combines a variety of prospecting tools in one.

In this respect, the prospector tool according to the present invention substantially departs from the conventional concepts and designs of the prior art, and in doing so provides an apparatus primarily developed for the purpose of providing a tool that combines a variety of prospecting tools in one.

Therefore, it can be appreciated that there exists a continuing need for new and improved prospector tool which can be used for providing a tool that combines a variety of prospecting tools in one. In this regard, the present invention substantially fulfills this need.

SUMMARY OF THE INVENTION

In the view of the foregoing disadvantages inherent in the known types of tools now present in the prior art, the present invention provides an improved prospector tool. As such, the general purpose of the present invention, which will be described subsequently in greater detail, is to provide a new and improved prospector tool and method which has all the advantages of the prior art and none of the disadvantages.

To attain this, the present invention essentially comprises a shovel handle having an open first end, a second end, and an intermediate extent therebetween. The open first end has locking threads. A locking sleeve is adjustably coupled with the locking threads. The second end has external threads thereon. The device contains a shovel having an upper end, a lower end, and a face portion. The upper end has a pivotable extending arm thereattached by a fastening means. The pivotable extending arm couples with the open first end of the shovel handle and the locking sleeve thereof. The pivotable extending arm serves to position the shovel at different angles. The lower end is a cutting edge. The face portion has a plurality of small holes therethrough. The plurality of small holes serve to sift sand. The device contains a tool handle having an open first end, and an open second end. The open first end has internal threads therein. The internal threads of the open first end are removably secured to the external threads of the second end of the shovel handle. The device contains a tool head having an extension thereattached. The extension is integral with the open second end of the tool handle. The tool head has a first end and a second end. The first end is a rock pick. The rock pick has a magnet embedded in a side thereof. The second end is a hammer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved prospector tool which has all the advantages of the prior art tools and none of the disadvantages.

It is another object of the present invention to provide a new and improved prospector tool which may be easily and efficiently manufactured and marketed.

It is a further object of the present invention to provide a new and improved prospector tool which is of durable and reliable construction.

An even further object of the present invention is to provide a new and improved prospector tool which is susceptible of a low cost of manufacture with regard to both materials and labor, and which accordingly is then susceptible of low prices of sale to the consuming public, thereby making such a prospector tool economically available to the buying public.

Still yet another object of the present invention is to provide a new and improved prospector tool which provides in the apparatuses and methods of the prior art some of the advantages thereof, while simultaneously overcoming some of the disadvantages normally associated therewith.

Even still another object of the present invention is to provide a new and improved prospector tool for providing a tool that combines a variety of prospecting tools in one.

Lastly, it is an object of the present invention to provide a new and improved prospector tool with a shovel handle. A shovel has a pivotable extending arm thereattached. The pivotable extending arm couples with the shovel handle. The pivotable extending arm serves to position the shovel at different angles. A tool handle is removably secured to the shovel handle. A tool head has an extension thereattached. The extension is integral with the tool handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front view of the preferred embodiment of the present invention.

FIG. 3 is a rear view of the present invention illustrating the shovel portion in the upper position.

The same reference numerals refer to the same parts through the various Figures.

DESCRIPTION OF THE PREFERRED EMBODIMENT

Figure 1:
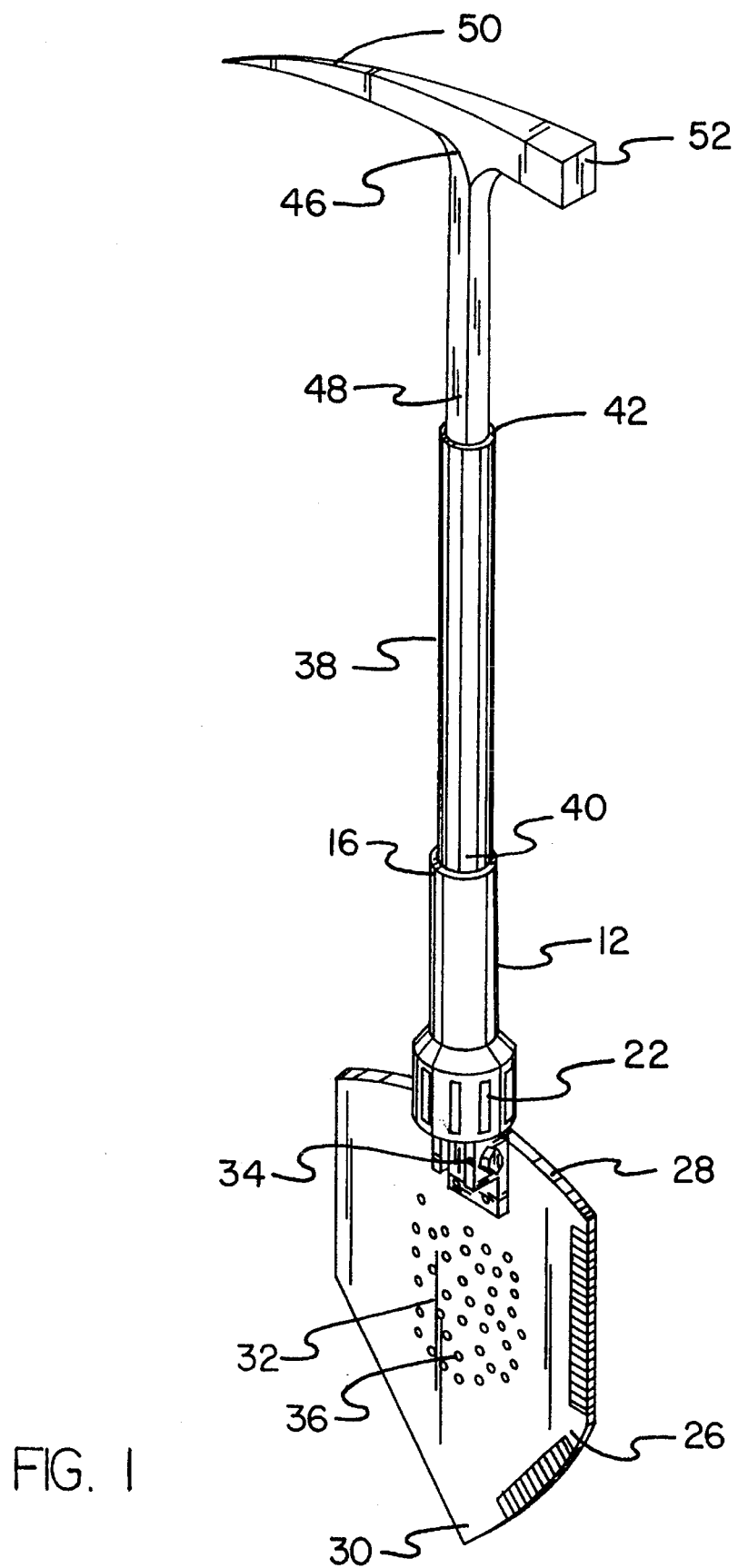
FIG. 1 is a perspective view of the preferred embodiment of the prospector tool constructed in accordance with the principles of the present invention.
Figure 4:
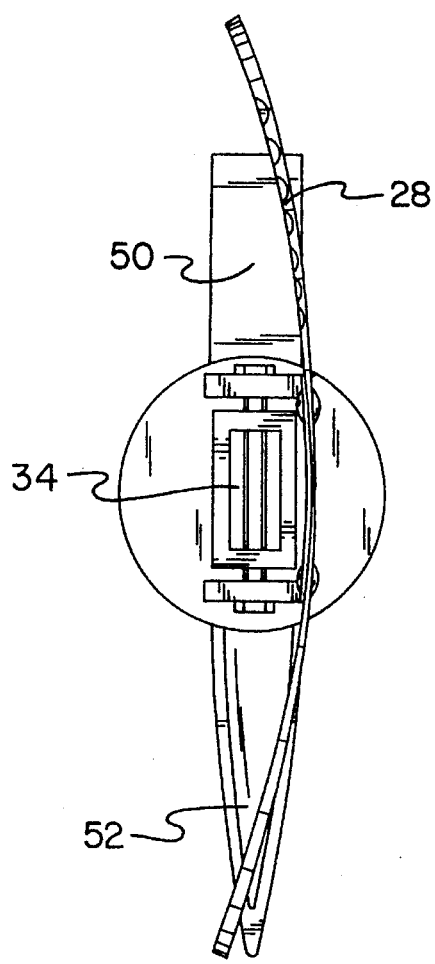
FIG. 4 is a bottom view of the pivotable extending arm of the present invention.
Figure 5:
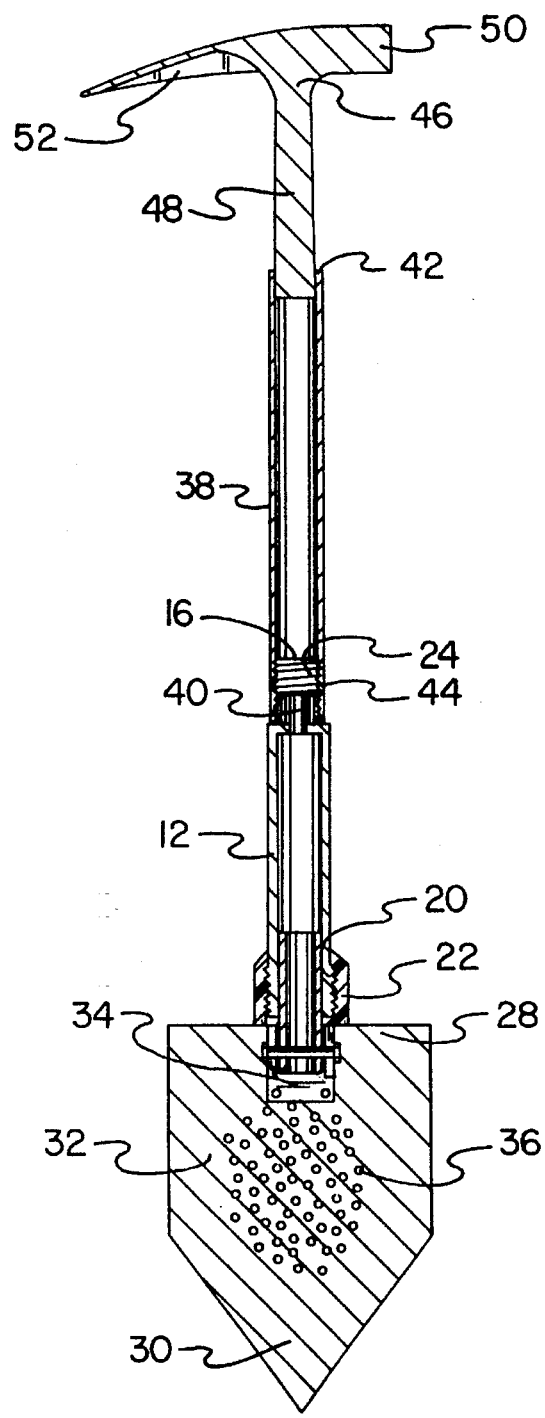
FIG. 5 is a cross-sectional view taken along line 5—5 of FIG. 2.
Figure 6:
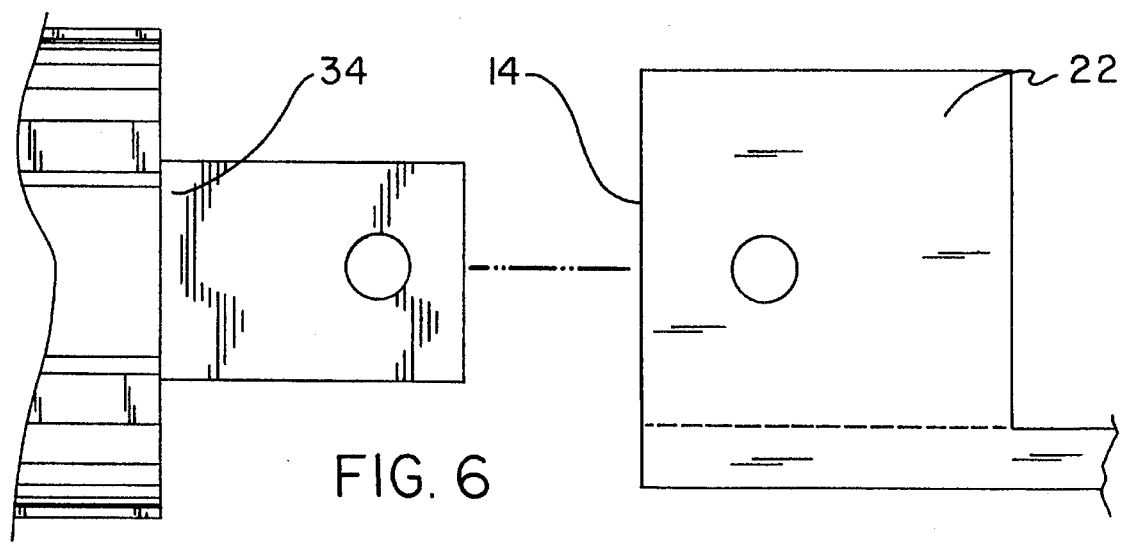
FIG. 6 is an enlarged sectional view taken from FIG. 3.

With reference now to the drawings, and in particular, to FIG. 1 thereof, the preferred embodiment of the new and improved prospector tool embodying the principles and concepts of the present invention and generally designated by the reference number 10 will be described.

Specifically, it will be noted in the various Figures that the device relates to a new and improved prospector tool for providing a tool that combines a variety of prospecting tools in one. In its broadest context, the device consists of a shovel handle, a shovel, a tool handle, and a tool head.

The device 10 contains a shovel handle 12 having an open first end 14, a second end 16, and an intermediate extent 18 therebetween. The open first end 14 has locking threads 20. A locking sleeve 22 is adjustably coupled with the locking threads 20. The second end 16 has external threads 24 thereon. An exterior of the shovel handle can be a non-slip material for use in hot weather when a user's hands can become sweaty.

The device 10 contains a shovel 26 having an upper end 28, a lower end 30, and a face portion 32. The upper end 28 has a pivotable extending arm 34 thereattached by a fastening means. The pivotable extending arm 34 couples with the open first end 14 of the shovel handle 12 and the locking sleeve 22 thereof. The pivotable extending arm 34 serves to position the shovel 26 at different angles. In the preferred embodiment, the number of angles positionable by the pivotable extending arm is three, but not be limited by this number. The lower end 30 is a cutting edge. The cutting edge is used to cut through shrubs, brush and roots. The face portion 32 has a plurality of small holes 36 therethrough. The plurality of small holes 36 serve to sift sand. The plurality of small holes allow the shovel to act as a sieve.

The device 10 contains a tool handle 38 having an open first end 40, and a seam. The open first end 40 has internal threads 44 therein. The internal threads 44 of the open first end 40 are removably secured to the external threads 24 of the second end 16 of the shovel handle 12. The tool handle has an exterior surface comprised on a non-slip material for use with sweaty hands.

The device 10 contains a tool head 46 having an extension 48 thereattached. The extension 48 is adjustably coupled with the second end 42 of the tool handle 38. This feature allows the tool head to be positioned for the convenience of a right-handed or a left-handed user. The tool head 46 has a first end 50 and a second end 52. The first end 50 is a rock pick. The rock pick has a magnet embedded in a side thereof. The magnet is an essential tool of the prospector. The magnet is used for testing minerals and metals and for separating black sand from gold dust. The second end 52 is a hammer. The rock pick is used to chip rock for sampling and to break loose hard ground. The pick could also be used as a pry bar to break loose large rocks embedded in soil. A crevice tool can be hollowed out of a bottom portion of the rock pick. The crevice tool is used for reaching into small cracks to bring out small amounts of gold-bearing soil for mineral sampling. The tool head 46 could also be represented by a combination of an axe and a hammer. This combination would be attractive, not only to prospector's, but campers and hikers as well.

Figure 7:
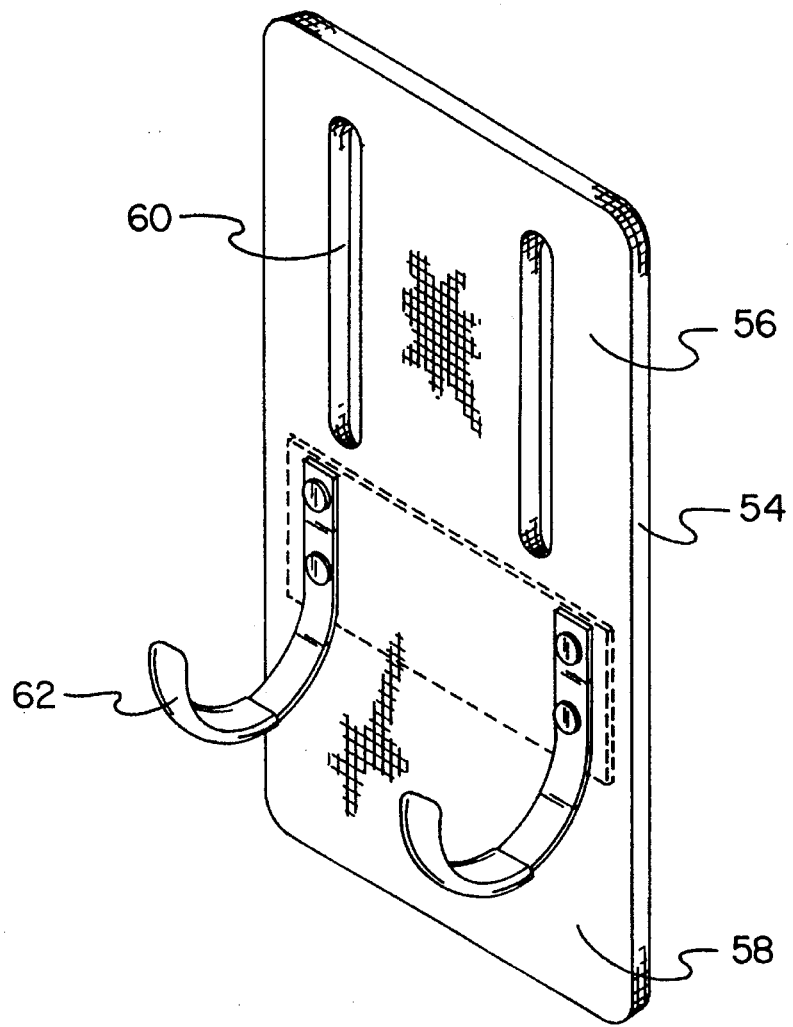
FIG. 7 is a perspective view of the second embodiment of the present invention.
Figures 8, 9:
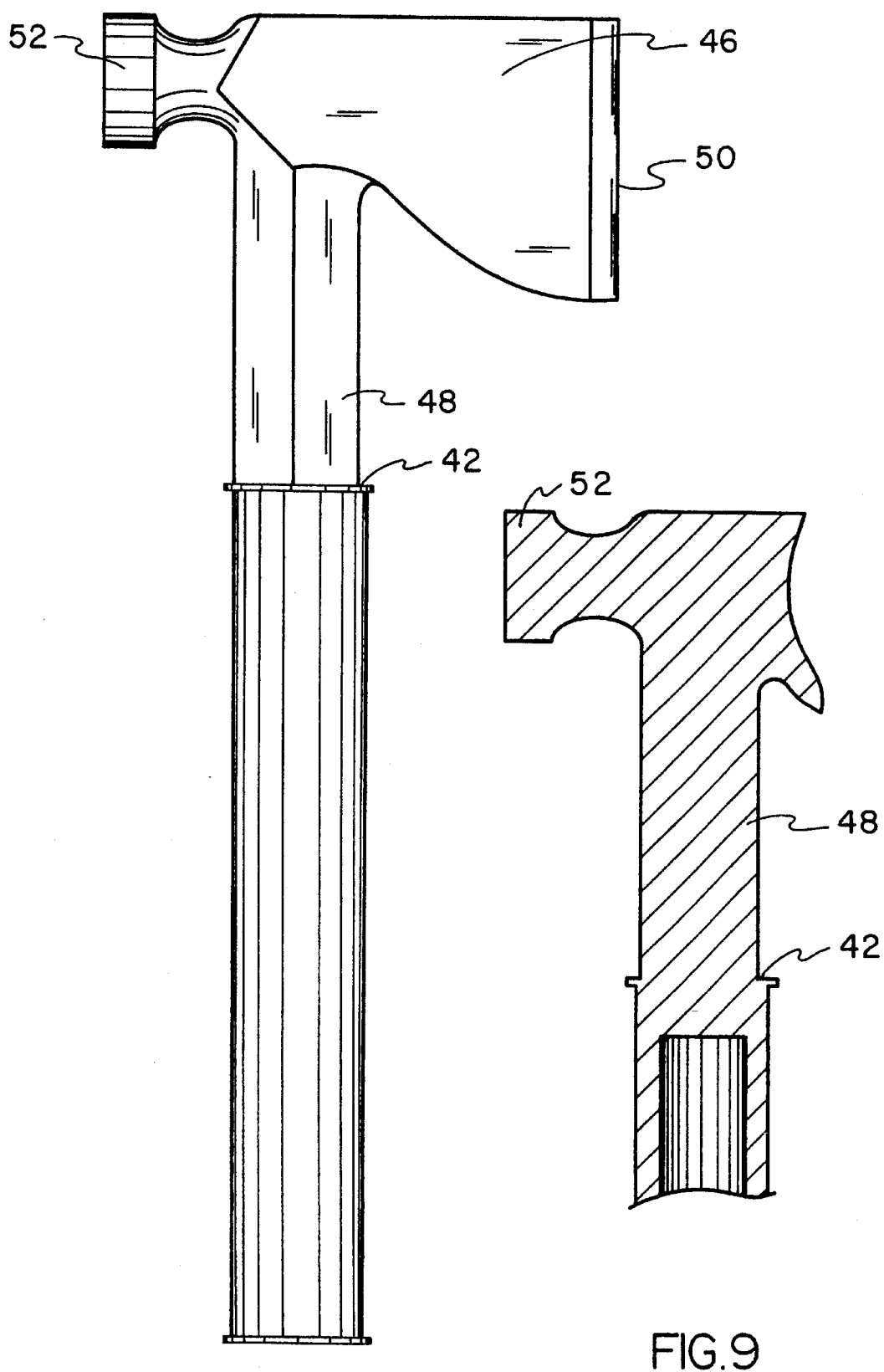
FIG. 8 is a side elevation view of the tool head and tool handle of the present invention.
FIG. 9 is a cross-sectional view of the tool head and tool handle of the present invention.

A second embodiment of the present invention is shown in FIG. 7 and includes substantially all of the components of the present invention further including a belt attachment 54 has an upper end 56 and a lower end 58. The upper end 56 has two oblong apertures 60 therethrough. The oblong apertures 60 serve to couple the belt attachment 54 to a belt. The lower end 58 has two hooks 62 secured thereto. The hooks serve 62 to provide a means for hanging the device 10 thereto. The user can hang the device 10 on the hooks 62 to leave their hands free to hold a metal detector or any other tool used when prospecting.

Figure 10:
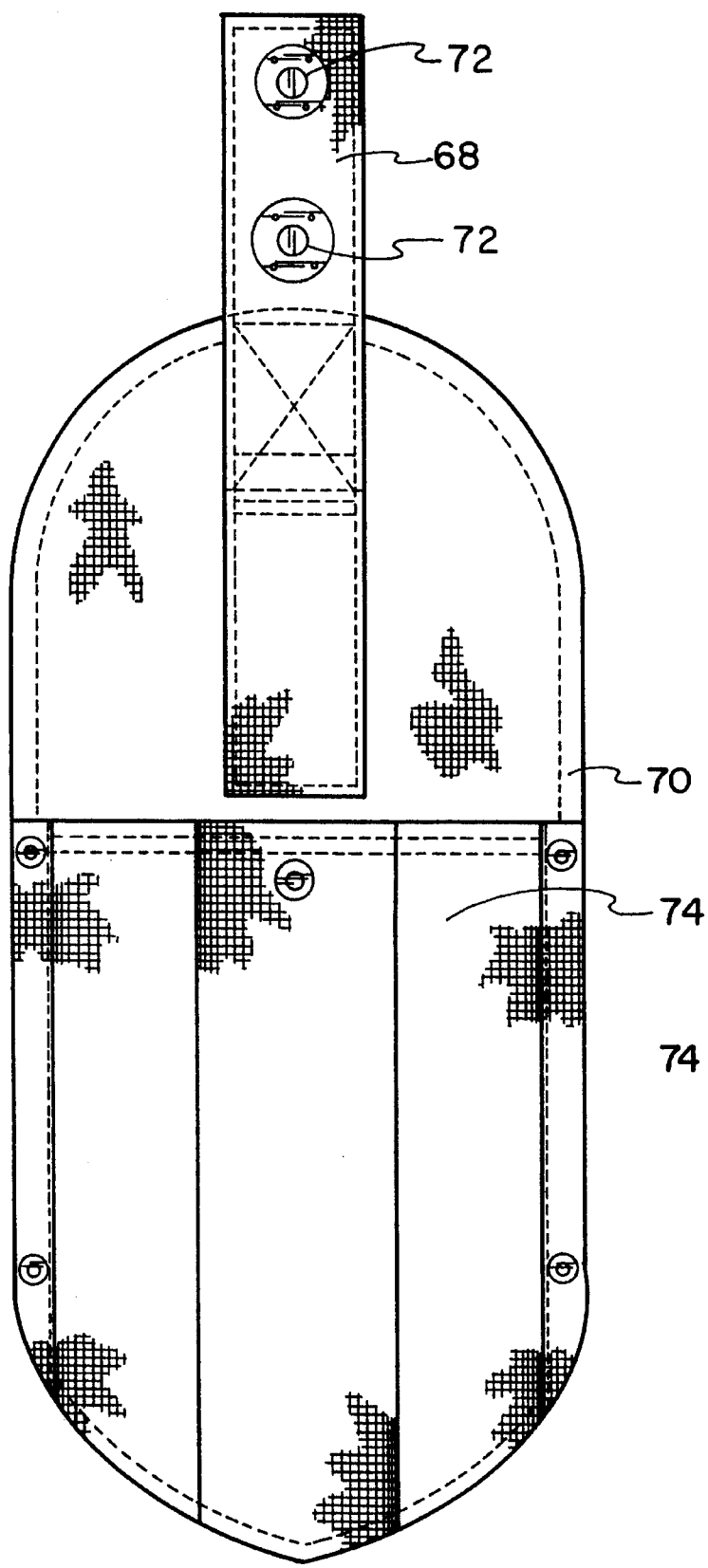
FIG. 10 is a front elevation view of the third embodiment of the present invention.
Figure 11:
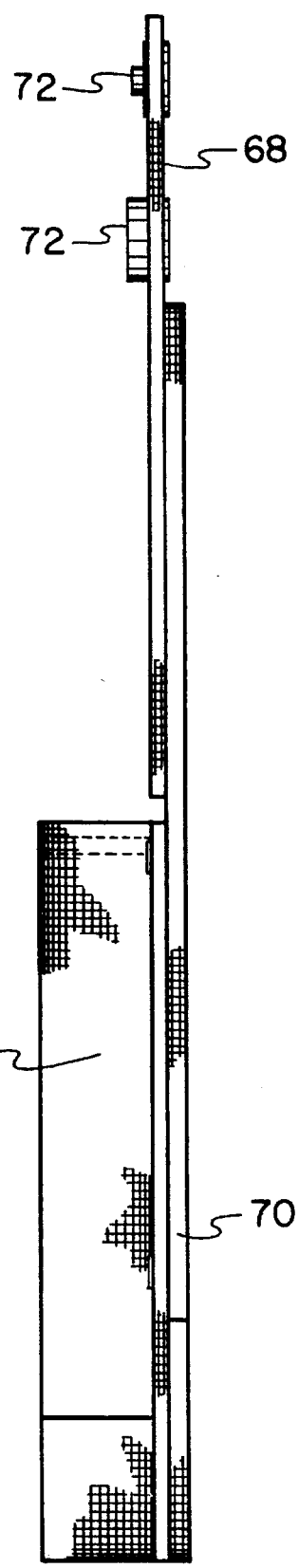
FIG. 11 is a side elevation view of the third embodiment of the present invention.

A third embodiment of the present invention is shown is FIG. 10 and includes substantially all of the components of the present invention further including a belt attachment 66 having an upper end 68 and a lower end 70. The upper end

68 has a securement means 72 thereattached. The securement means 72 serves to couple the belt attachment 66 to a belt. The lower end 70 having a plurality of carrying pockets 74 thereon. The carrying pockets 74 serve to provide a means for carrying the prospector tool and attachments therein. The shovel 26 can be pivoted to a closed position to allow it to be stored within one of the plurality of carrying pockets 74.

The present invention is a combination prospector's tool that consists of a shovel and detachable rock pick/hammer and axe/hammer tools.

It is made of steel and consists of a pointed prospector's shovel and detachable rock pick/hammer and axe/hammer tools. The shovel's blade has numerous small holes for sifting sand and a cutting edge for cutting through brush and roots; it can be rotated into three different working positions. Its handle has a threaded inside diameter into which the detachable tools are screwed. A "crevice tool" hollowed out under the pick, reaches into small cracks to retrieve small quantities of gold-bearing soil for mineral sampling. A magnet, embedded in the pick's side, is used for such things as separating black sand from gold dust. A tube with a threaded inner diameter covers the attaching bolts on the pick/hammer and axe/hammer tools when used separately.

With the desired tool attached to the shovel, the tools are used as needed and can be carried as one. The pick/hammer is used to chip rock and break hard ground, and the axe/hammer is used to cut firewood and clear bush.

It provides six tools-shovel, pry bar, crevice tool, pick, rock hammer, and magnet-in one rather than separate tools that have to be carried to the prospecting site.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A new and improved prospector tool for providing a tool that combines a variety of prospecting tools in one comprising, in combination:

a shovel handle having an open first end, a second end, and an intermediate extent therebetween, the open first end having locking threads, a locking sleeve adjustably coupled with the locking threads, the second end having external threads thereon;

a shovel having an upper end, a lower end, and a face portion, the upper end having a pivotable extending arm thereattached by a fastening means, the pivotable extending arm coupling with the open first end of the shovel handle and the locking sleeve thereof, the pivotable extending arm serving to position the shovel at different angles, the lower end being a cutting edge, the face portion having a plurality of small holes therethrough, the plurality of small holes serving to sift sand;

a tool handle having an open first end, and a second end, the open first end having internal threads therein, the internal threads of the open first end removably secured to the external threads of the second end of the shovel handle;

a tool head having an extension thereattached, the extension adjustably coupling with the second end of the tool handle, the tool head having a first end and a second end, the first end being a rock pick, the rock pick having a magnet embedded in a side thereof, the second end being a hammer.

2. The device as described in claim 1 and further including a belt attachment having an upper end and a lower end, the upper end having two oblong apertures therethrough, the oblong apertures serving to couple the belt attachment to a belt, the lower end having two hooks secured thereto, the hooks serving to provide a means for hanging the prospector toll thereto.

3. The device as described in claim 1 and further comprising a belt attachment having an upper end and a lower end, the upper end having a securement means thereattached, the securement means serving to couple the belt attachment to a belt, the lower end having a plurality of carrying pockets thereon, the carrying pockets serving to provide a means for carrying the prospector tool and attachments therein.

* * * * *